United States Patent Office 3,137,673
Patented June 16, 1964

3,137,673
PROCESS OF MAKING POLYVINYL ALCOHOL FIBERS EXHIBITING IMPROVED DYEABILITY BY INCORPORATING THEREIN A WATER INSOLUBLE POLYMER CONTAINING BASIC NITROGEN
Kanji Matsubayashi and Osamu Fukushima, Kurashiki, Japan, assignors of three-fourths to Kurashiki Rayon Co., Ltd., Kurashiki-shi, Japan, a corporation of Japan, and one-fourth to Air Reduction Company, Incorporated, New York, N.Y., a corporation of New York
No Drawing. Filed July 15, 1960, Ser. No. 42,998
Claims priority, application Japan July 16, 1959
2 Claims. (Cl. 260—45.5)

The invention relates to a method for producing polyvinyl alcohol fibers of improved dyeability.

As described in co-pending application Ser. No. 856,334, filed December 1, 1959, by spinning from a mixture of emulsified polymers formed from basic monomers, and a water solution of polyvinyl alcohol, fibers can be produced which have increased dyeability and even after benzalization, which has an important action in promoting the elastic recovery of the fibers, no noticeable drop in dyeability occurs. This is completely different from fibers produced from water-soluble polymers containing basic nitrogen by procedures proposed in the past. By such prior methods, polyvinyl alcohol fibers concurrently having excellent elastic recovery and dyeability cannot be produced.

We have found, as described in our co-pending application Ser. No. 15,800, filed March 18, 1960, that by introducing basic nitrogen by means of nitrogen-containing aldehydes, into water-insoluble acetalized polyvinyl alcohol simultaneously with, before, or after another acetalization-reaction there is imparted to the solid polymer particles a hydrophilic quality and an electrical repulsion which makes it possible not only to produce an emulsion but to produce an emulsion having increased stability as compared with that of acetalized polyvinyl alcohol containing no basic nitrogen.

It is an object of this invention to provide a novel process for producing fibers derived from polyvinyl alcohol having high hot water-resistance, high heat-resistance and desirable mechanical properties similar to those of fibers produced solely from polyvinyl alcohol, yet characterized by a particularly high dyeability.

In accordance with this invention, spinning of fibers is effected from a spinning fluid prepared by dispersing in a water solution of polyvinyl alcohol an emulsion or a fine powder of a water-insoluble polyvinyl alcohol derivative or of a copolymer composed principally of vinyl alcohol units, containing basic nitrogen. The copolymer is obtained by acetalizing a copolymer composed principally of vinyl alcohol units and containing basic nitrogen with aldehydes containing no basic nitrogen. The polyvinyl alcohol derivative and the copolymer are obtained by introducing basic nitrogen by chemical reaction into a polyvinyl alcohol derivative or a derivative of a copolymer composed principally of vinyl alcohol units which contain a reactive group which is readily convertible into basic nitrogen, such as a halogen radical, a cyano group, a carbonyl group, and an acid amide group, and acetalizing with aldehydes containing no basic nitrogen, the polymer or copolymer being acetalized by means of aldehydes containing no nitrogen simultaneously with, prior to, or after the conversion of the convertible group.

In accordance with the present invention, we have discovered that since an emulsion or a finely-divided powder of water-insoluble polyvinyl alcohol derivatives containing basic nitrogen, or like derivatives of copolymers composed principally of vinyl alcohol units, possess an adequate hydrophilic quality because of the basic nitrogen content, it is readily mixable with water-soluble polymers such as polyvinyl alcohol, and when a spinning fluid prepared, as described in said co-pending application Ser. No. 856,334, by dispersing these substances in a water solution of polyvinyl alcohol, no difficulty is experienced in the process of spinning.

We have furthermore found that, although the particle size of the solid particles of the emulsified polymers contained in a stable spinning fluid which provides freedom from difficulty in the spinning operation, and consequently in the fiber produced, is normally below $0.1\mu$, as described in said co-pending application Ser. No. 856,334, it is possible in accordance with this invention to use particles having varying particle sizes ranging from $0.1\mu$ to $10\mu$, and the larger the particle size, the greater the increase in dyeability after benzalization has been effected. The reason for this behavior is not fully understood but it is believed that, in the case of these solid particles, the larger the particle size, the less the particles are affected by the structure of the polyvinyl alcohol portion of the fiber, and even if the polyvinyl alcohol portion is made hydrophobic by benzalization, it retains a condition which permits dyestuffs to penetrate easily. However, when the particle size is too large, broken and nappy filaments will result in the course of spinning, with subsequent deterioration in the mechanical properties of the fiber. Therefore, it is desirable that the particle size be below $30\mu$. The emulsion or finely-divided powder contained in the mixed spinning fluid which can be produced by the method of this invention is stable, and particle sizes are not over $10\mu$, so that smooth spinning can be effected.

However, in order to obtain a stable spinning fluid, there is necessary interrelationship among the amount of basic nitrogen contained in the polymers employed, the extent of acetalization by aldehydes containing no basic nitrogen, and the percentage of unreacted vinyl alcohol units. These interrelationships cannot be defined exactly because they vary with the extent of the hydrophilic properties of the basic nitrogen, or of the units containing basic nitrogen, and the magnitude of the hydrophobic qualities of the portion of the molecule acetalized by aldehydes containing no basic nitrogen. However, the percentage of basic nitrogen in the polymer is suitably 0.2%–5% by weight and the degree of acetalization by aldehydes containing no basic nitrogen is suitably 20–80 mol percent, the remainder being unreacted polyvinyl alcohol units.

In preparing the polymers used in this invention, when acetalization by means of aldehydes containing no basic nitrogen is effected, it is generally desirable to apply high-speed agitation, e.g. 1000 r.p.m., to the reaction mixture or to use a surface-active agent. By this procedure, the desired emulsion can readily be produced in the case of polyvinyl alcohol polymers which already contain basic nitrogen. Even in the case of the polyvinyl alcohol polymers containing no basic nitrogen, when the introduction of basic nitrogen is effected simultaneously with the acetalization reaction, the desired emulsion is also readily obtained. When, however, the introduction of basic nitrogen is to be effected after acetalization by means of aldehydes containing no basic nitrogen, it is desirable to carry out the reaction to introduce basic nitrogen after the acetalized polyvinyl alcohol is in the form of a fine powder. Alternatively, the introduction of basic nitrogen can be effected after the acetalized polyvinyl alcohol has been emulsified and dispersed in water in the presence of an emulsifier or protective colloid.

As copolymers composed principally of vinyl alcohol units and containing basic nitrogen, or their derivatives, there are suitably used the copolymers of vinyl esters, e.g. vinyl acetate, and basic monomers, or their saponification products. To form polyvinyl alcohol derivatives, or copolymers compised principally of vinyl alcohol units, or their derivatives, having a reactive or convertible group which can readily be converted to basic nitrogen, aldehydes containing groups such as halogen radicals, cyano groups, carbonyl groups, and acid amide groups are suitably used.

Such polyvinyl alcohol derivatives or copolymers are also produced by acetalization or etherification of polyvinyl alcohol or compolymers by means of epoxy compounds, and the like. Similarly such copolymers are the copolymers which result from polymerizing vinyl esters and monomers containing reactive or convertible groups of the type referred to above. The saponification products of the above-mentioned polymer and copolymers are also suitably used.

The reactions which may be employed for introducing basic nitrogen include the saponification of the acid amide groups, the reaction of ammonia or of an amine on halogenides, the amidoximation by hydroxylamine of cyanoradicals, the reduction of carbonyl groups in the presence of ammonia, Strecker's reaction by means of ammonia, or an amine and inorganic cyanide compound, and like known reactions.

Aldehydes, epoxy compounds, and the like which contain radicals readily convertible to basic nitrogen which are suitably used include chloroacetaldehyde, $\beta$-bromopropionaldehyde, $\beta$-chlorobutyraldehyde, $\beta$-cyanopropionaldehyde, $\beta$ - acetylaminobutyraldehyde, methylglyoxal, acetylacetaldehyde, levulinaldehyde, or their acetals, epichlorohydrine, and the like, and acrylonitrile, and the like.

Vinyl esters suitable for making copolymers include vinyl acetate and the like, and monomers containing basic nitrogen include 2-vinylpyridine, 4-vinylpyridine, 2-methyl - 5 - vinylpyridine, 5-ethyl-2-vinylpyridine, 4-vinylpyridine, vinylquinoline, allylamine, allylcyclohexylamine, $\beta$ - diethylaminoethyl-methacrylate, 2-methyl-5-vinylpyridiniumethyl bromide, 4-vinylpyridiniummethyl methylsulfate, allylpyridinium chloride and the like. Monomers containing radicals readily convertible to basic nitrogen include allylchloride, allylbromide, N-vinylphthalimide, N-vinylsuccinimide, methylvinylketone, acrolein, acrylonitrile, and the like. Aldehydes containing no basic nitrogen include formaldehyde, acetaldehyde, propionaldehyde, butyraldehyde, isobutyraldehyde, 2-ethyl-hexylaldehyde, nonylaldehyde, dodecylaldehyde, chloroacetaldehyde, $\beta$-cyanopropionaldehyde, methylglyoxal, malonaldehyde, benzaldehyde, monochlorobenzaldehyde, p-cyanobenzaldehyde, terephthaldehyde, salicylaldehyde, 1-naphthaldehyde, tetrahydrobenzaldehyde, trimethyltetrahydrobenzaldehyde, hexahydrobenzaldehyde, phenylacetaldehyde, cinnamaldehyde, and the like aliphatic, aromatic and aralkyl aldehydes.

In connection with the foregoing, reference is particularly made to our two copending applications filed March 18, 1960, entitled "Method of Manufacturing Fibers of Polyvinyl Alcohol With Improved Dyeability" Serial No. 15,800 and "Method of Making Fibers of Polyvinyl Alcohol Having Improved Dyeability" Serial No. 15,799.

In general, various known types of anionic, non-ionic, and cationic surface-active agents are suitably used. However, when basic nitrogen is introduced by chemical reaction, an anionic surface-active agent often may form a bond with the introduced basic nitrogen to coagulate the emulsion. Hence, it is preferred to use a non-ionic surface-active agent such as polyoxyethylenedodecyl ether, or a cationic surface-active agent such as dodecyltrimethylammonium chloride. As protective colloids, water-soluble polymers such as polyvinyl alcohol, partially-saponification products of polyvinyl acetate, gelatin, soluble starch, and aminoacetalized polyvinyl alcohol, are suitably used.

In preparing a fiber-spinning solution from polyvinyl alcohol and the polymers and monomers referred to above in accordance with this invention, the ratio of polymer or copolymer to polyvinyl alcohol is such that the content of nitrogen is 0.05%–2% by weight based on the total polymeric material present. By the use of this ratio, a significant elevation in dyeability is observed with respect to direct cotton dyes, acid wool dyes, and the like while any decrease in hot water-resistance, heat-resistance, mechanical properties and the like, is negligible.

The spinning fluid containing an emulsion or fine powder of polymers or co-polymers produced in accordance with the present invention is sufficiently stable without the use of any surface active agent, but any of the known surface-active agents such as dodecyltrimethylammonium-chloride, polyoxyethylenedodecyl ether, and the like may be used, if desired.

It is possible to carry out spinning by means of the spinning fluid prepared by dispersing an emulsion or a fine powder of the polyvinyl alcohol derivatives with polyvinyl alcohol by the method of this invention, with the addition of various types of water-soluble polymers such as soluble starch, polyvinylpyrrolidone, aminoacetalized polyvinyl alcohol, various kinds of pigments such as titanium oxide, and acids, alkalis, and salts such as sodium sulfate, and the like. Accordingly, it is possible to simultaneously effect improvements in the transparency and in the form of the cross-section of the fibers, particularly when the fibers are formed by wet spinning.

The fibers spun by the method of this invention may be subjected to thermal elongation, i.e. hot-stretching, heat-treatment and insolubilization treatments in the same manner as fibers formed solely from ordinary polyvinyl alcohol. For effecting insolubilization, acetalization by means of aliphatic, aromatic or aralkyl aldehydes is suitably employed. Suitable aldehydes for this purpose include formaldehyde, acetaldehyde, chloroacetaldehyde, butyraldehyde, nonylaldehyde, benzaldehyde, monochloro benzaldehyde, 1-naphthaldehyde, glyoxal, malonaldehyde, glutaraldehyde, terephthalaldehyde, and like aliphatic, aromatic and aralkyl aldehydes. The fibers may also be subjected to treatments with inorganic reagents such as titanation, and chroming. Various other known insolubilization treatments may also be employed.

The invention will be further understood from the following specific examples of practical application. However, it will be understood that these examples are not to be construed as limiting the scope of the present invention in any manner. In these examples, all parts are by weight, unless otherwise indicated.

*Example 1*

Vinyl acetate (450 g.) and 5-ethyl-2-vinyl-pyridine (36.7 g.) were mixed, and to this mixture benzoyl peroxide (4.9 g.) was added as catalyst. Polymerization in bulk was then effected at 60° C., and after 48 hours the copolymer which was produced was dissolved in methanol, and reprecipitated in water. It was boiled in the water to purify it, and there were recovered 370 g. of the copolymer.

This copolymer was then dissolved in methanol (3 l.), and saponified by means of a 2 N caustic soda solution, to produce 160 g. of a saponification product. The nitrogen content in this saponification product was 0.8%. A water solution containing 3% of the copolymer of polyvinyl alcohol containing basic nitrogen thus produced, 1% of formaldehyde, and 50% of sulfuric acid was reacted at 50° C. for 2 hours under continuous agitation at the rate of 1000 r.p.m. A water solution of a dispersant (1%), was then gradually added drop-wise at 40° C. in sufficient quantity to dilute the emulsion to twice its original volume. The resultant diluted emulsion was purified by removing unreacted substances and sulfuric acid by means of dialysis in running water.

The product thus obtained was mixed with a water solution of polyvinyl alcohol in an amount such that the nitrogen content in the total polymer was 0.19%, and a spinning fluid of a total polymer concentration of 15% was prepared. This fluid was wet-spun into a sodium sulfate coagulation bath, and the fibers thus produced were heat-treated at 240° C. for 10 min. at a constant yarn length, and then acetalized at 60° C. for one hour in a water solution containing benzaldehyde (2%), sulfuric acid (10%) and methanol (50%). These fibers were identified as Sample 1. For purposes of comparison, a water solution containing polyvinyl alcohol alone was wet-spun and the fibers were subjected to heat-treatment, and acetalization as described above. These fibers were identified as Sample 2. Various properties of the two samples were then determined, with the following results:

| Property | Sample (1) | Sample (2) |
|---|---|---|
| Degree of Acetalization (Percent) | 21.5 | 20.9 |
| Strength (g./denier) | 3.1 | 3.4 |
| Shrinkage in water at 100° C. (Percent) | 4.5 | 5.0 |
| Dry thermal softening point (° C.) | 201 | 203 |
| Elasticity at 3% elongation (Percent) | 77 | 81 |
| Rate of absorption of acid dye (Percent) [1] | 85 | 0 |

[1] The fibers were dyed with Acid Brilliant Scarlet 3R (4%) and sulfuric acid 2% (percentages based on the weight of fiber) at 95° C. for one hour.

The several properties set forth above show that the fibers are suitable for practical use. Particularly with respect to elasticity, the fibers are superior to ordinary formalized vinylon, which has an elasticity at 3% elongation of about 60%. With respect to dyeability, Sample 1 which was produced in accordance with this invention gave an obviously outstanding improved result.

When microscopic examination was made of the cross section and the side surface of the dyed fibers of Sample 1, the presence of dyed particles of fine powder of a particle size of a few $\mu$ was observed. The spinning fluid of this example from which the fibers of Sample 1 were spun was extremely stable. Even after it had been allowed to stand for 48 hours at 90° C., no coagulation of particles was noted, and no abnormality was observed in the spinning fluid when it was handled for storage and spinning in the same manner as a spinning fluid containing only ordinary polyvinyl alcohol.

*Example 2*

A copolymer produced from vinyl acetate (80 g.) and methylvinylketone (11.8 mol percent) was dissolved in ammonia-saturated methanol (0.5 l.) and Raney nickel (1 g.) was added. The mixture was placed in an autoclave of 1 liter capacity into which hydrogen was charged to provide a pressure of 42 atmospheres. The contents of the autoclave were heated at 80° C. for 4 hours. The product thus obtained was washed and precipitated with methanol. The copolymer containing basic nitrogen thus obtained was then formalized and formed into an emulsion in accordance with the procedure described in Example 1 and this emulsion was found to be extremely stable to the addition of a water solution of sodium sulfate and to exposure to a temperature of 120° C.

This emulsion was mixed with polyvinyl alcohol in an amount such that the nitrogen content in the total polymers was 0.15%, and a spinning fluid of 35% concentration was prepared. This fluid was dry-spun by extruding into the air through a nozzle of 0.3 mm. diameter. The fibers thus produced were continuously stretched by 500% to 220° C., and then shrunk by 20% at 225° C. One portion of the thus-treated fibers were then formalized in a water solution containing formaldehyde (5%), sulfuric acid (15%) and sodium sulfate (15%), and the remainder of the fibers were benzalized in a water solution containing benzaldehyde (3%), sulfuric acid (10%) and methanol (40%). The formalized fibers were identified as Sample 5 and the benzalized fibers were identified as Sample 4. The degree of acetalization of (3) was 38.4% and the degree of acetalization of (4) was 29.6%. Shrinkage upon treatment of Samples 3 and 4 with water at 100° C. for one hour was 5.3% and 7.5% respectively. These values demonstrated adequate hot water-resistance. The elasticity at 3% elongation was 53% for Sample 3 and 83% for Sample 4. In this case, the benzalized fibers gave a superior result. When these fibers were dyed with an acid dye under the conditions described in Example 1, they completely absorbed the dye. When dyed with 2% Nippon Fast Violet BB conc., a direct cotton dye, and 10% sodium sulfate (percentages based on the weight of fiber) at 90° C. for 2 hours, Sample 3 absorbed the dye 75% and to the extent of Sample 4 to the extent of 90%, both giving a saturated and bright color.

The spinning fluid prepared as described above was allowed to stand at about 100° C. for about 30 hours. During this time, the temperature reached a maximum of 130° C., but the spinning fluid remained highly stable, and no trouble arose in the spinning process.

*Example 3*

A mixture composed of vinyl acetate (73 g.), allyl bromide (18.2 g.) polyvinyl alcohol (19.1 g.), potassium persulfate (1.6 g.) acid sodium sulfite (1 g.) and water (600 g.) were agitated at a temperature of 60° C. to effect emulsion polymerization.

In about 2 hours, the emulsion coagulated, and a precipitate was formed. After a further 5 hours, the precipitate was dissolved in methanol, the solution poured into water, and the mixture boiled to purify the copolymer. This process was repeated, and there was recovered a copolymer containing 14.5 mol percent allyl bromide in a yield of 55%. This product was dissolved in methanol, to which diethylamine (500 mol percent) was added, and the mixture was heated in an autoclave at 70° C. for 24 hours to convert the greater part of the bromide into the diethylamino-group. The product was then subjected to conventional alkaline saponification and the copolymer containing basic nitrogen thus obtained was formalized, emulsified, and purified in the manner described in Example 1. This emulsion was equal in stability to the emulsion produced in Example 2, and the polymer in the emulsion had a basic nitrogen content of 1.3%. This emulsion was mixed with polyvinyl alcohol in an amount such that the nitrogen content in the total polymers was 0.15%. The spinning fluid thus produced was wet-spun as described in Example 1, and the fibers produced were hot-stretched by 180% at 230° C. in 30 min., and then heat-treated at 250° C. for 30 min. at constant yarn length. Samples of the fibers were benzalized to the extent of 16.0%, 22.4%, and 29.9%, and then dyed under the conditions described in Example 1. The several samples were found to absorb completely Acid Brilliant Scarlet 3R (4%—based on the weight of fiber). These fibers had a feel rich with resilience.

*Example 4*

A water solution containing chloroacetaldehyde (0.5%), formaldehyde (1%), polyvinyl alcohol (3%), and sulfuric acid (50%) was reacted in the manner described in Example 3. The reaction mixture was diluted to obtain finely-divided acetalized polyvinyl alcohol containing halogen. This polymer was treated in a water solution containing ethylenediamine (30%) at 80° C. for 10 hours with continuous stirring. After removal of excess ethylenediamine, the reaction mixture was purified by dialysis and was then mixed with a water solution of polyvinyl alcohol as described in Example 1 to produce an extremely stable spinning fluid.

Following the procedure described in Example 1, the fluid was wet-spun and the fibers were heat-treated and benzalized. The fibers thus produced had excellent dyeability and elasticity.

*Example 5*

A mixture composed of N-vinylsuccinimide (17 g), vinyl acetate (275 g.) and azobisisobutyronitrile (0.15 g.) was agitated at 60° C. for 6 hours. The reaction mixture was dissolved in a mixed solvent consisting of acetone and chloroform, and the solution was precipitated in petroleum ether. There were thus obtained 240 g. of a copolymer containing 0.70% nitrogen.

This copolymer was subjected to conventional alkaline saponification and formalized in the manner described in Example 1. The saponified product was obtained in finely divided form. At the time of saponification and formalization, substantial hydrolysis of the imide group took place and the finely-divided polymer exhibited a significant dyeability with acid dyes. This polymer was mixed with polyvinyl alcohol, wet-spun with subsequent heat-treatment as described in Example 1. When the fibers were then formalized in the manner described in Example 2, a product with excellent dyeability for direct cotton colors was obtained.

The various reactions referred to for the purpose of introducing basic nitrogen into the polyvinyl alcohol molecule are carried out by techniques well known in the polyvinyl alcohol art. In addition, the procedures described in our two above-mentioned copending applications Serial Nos. 15,800 and 15,799 are wholly suitable. Reference is also made to Osugi et al. Patent No. 2,906,594 with respect to polymers containing basic nitrogen and with respect to the introduction of basic nitrogen.

The surface-active or dispersing agents or dispersants and protective colloids which are suitably employed are, in addition to those mentioned above, any of the many dispersing agents and protective colloids known to those skilled in the art of making emulsions or dispersions of polymers. In the foregoing examples, for instance, polyoxyethylenedodecyl ether is suitably used as the dispersant or surface-active agent.

It will therefore be understood that, unless otherwise indicated, conventional operations and conventional apparatus are employed in carrying out the process of this invention including conventional mixing and emulsifying processes and units. Similarly, conventional dyeing techniques and apparatus are suitably employed upon the fibers produced by the process of this invention. The conditions and the relative relationships set forth in the examples are those preferred in carrying out the process of the invention but it will be understood that other conditions and relationships may be used within the scope of the invention.

With respect to known saponification techniques, reference is suitably made, for example to Bristol U.S. Patent 2,700,035, Waugh et al. U.S. Patent 2,642,419 and Germain U.S. Patent 2,643,994. Of particularly suitability are the process techniques and apparatus described in the copending application of Tsuguo Kominami, Serial No. 862,626, filed December 29, 1959.

The spinning fluids produced in accordance with the present invention are particularly suitable for the spinning of fibers in accordance with known processes used in the spinning of polyvinyl alcohol and polyvinyl alcohol derivatives, particularly the so-called "wet-spinning" techniques as described, for example, in Cline et al. U.S. Patent 2,610,360 and Osugi et al. Patent No. 2,906,594. An especially preferred spinning technique is described in copending application Serial No. 336,166 of Tomonari et al. filed February 10, 1953.

After formation of the fibers by wet spinning the filaments can, as mentioned, be further treated by stretching, heat-treating, acetalization, and the like to produce fibers with desirable and outstanding properties, and for this purpose known techniques such as described in said patents are suitably used.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:

1. In the manufacture of polyvinyl alcohol fibers, the steps which comprise preparing an aqueous spinning fluid comprising a mixture of polyvinyl alcohol and a vinyl alcohol polymeric component which is insoluble in said spinning fluid and is dispersed therein in finely-divided form of 0.1 to 10$\mu$ in diameter, said polymeric component being a member of the group consisting of water-insoluble vinyl alcohol homopolymers containing basic nitrogen and water-insoluble vinyl alcohol copolymers containing basic nitrogen and composed principally of vinyl alcohol units, said copolymers being formed from a comonomer selected from the group consisting of monomers containing basic nitrogen, monomers containing a halogen radical, monomers containing a cyano group, monomers containing a carbonyl group, and monomers containing an acid amide group, said polymeric component containing 0.2 to 5% of basic nitrogen, and said polymeric component being formed from a polymer selected from the group consisting of a vinyl alcohol homopolymer containing a reactive group and a vinyl alcohol copolymer composed principally of vinyl alcohol units and containing a reactive group, said reactive group being a member of the class consisting of halogen, a —CN group, a carbonyl group, and an acid amide group, and said basic nitrogen being introduced by converting said reactive group to basic nitrogen, and said polymeric component being given said finely-divided form by acetalizing said polymeric component with an aldehyde containing no nitrogen while agitating said polymeric component in an aqueous medium, and spinning said fluid to form fibers therefrom.

2. A process as defined in claim 1, wherein the fibers produced contain 0.05 to 2% of nitrogen.

References Cited in the file of this patent

UNITED STATES PATENTS

| | | |
|---|---|---|
| 2,895,786 | Schlack | July 21, 1959 |
| 2,906,594 | Osugi | Sept. 29, 1959 |